Patented Sept. 13, 1932

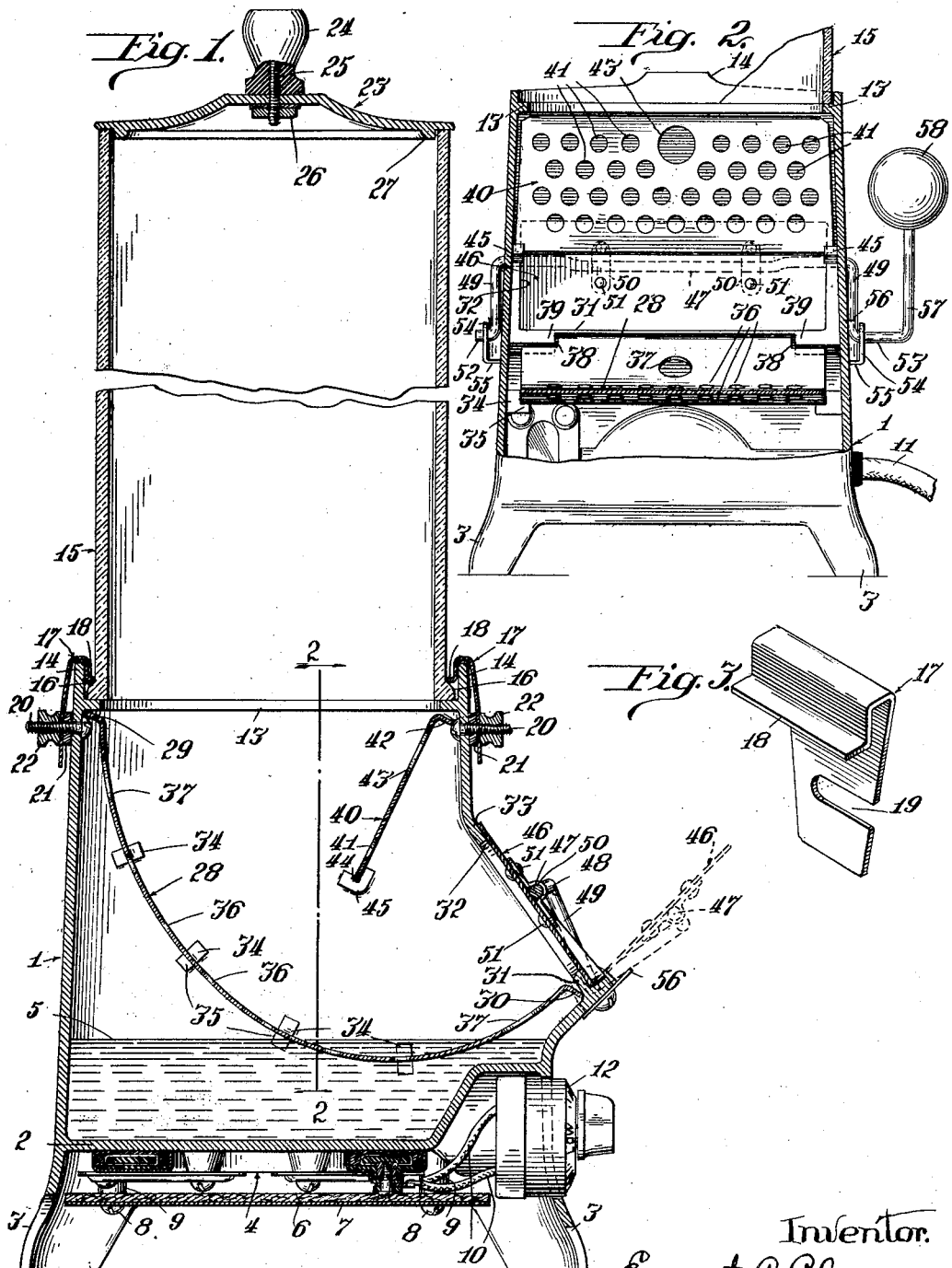

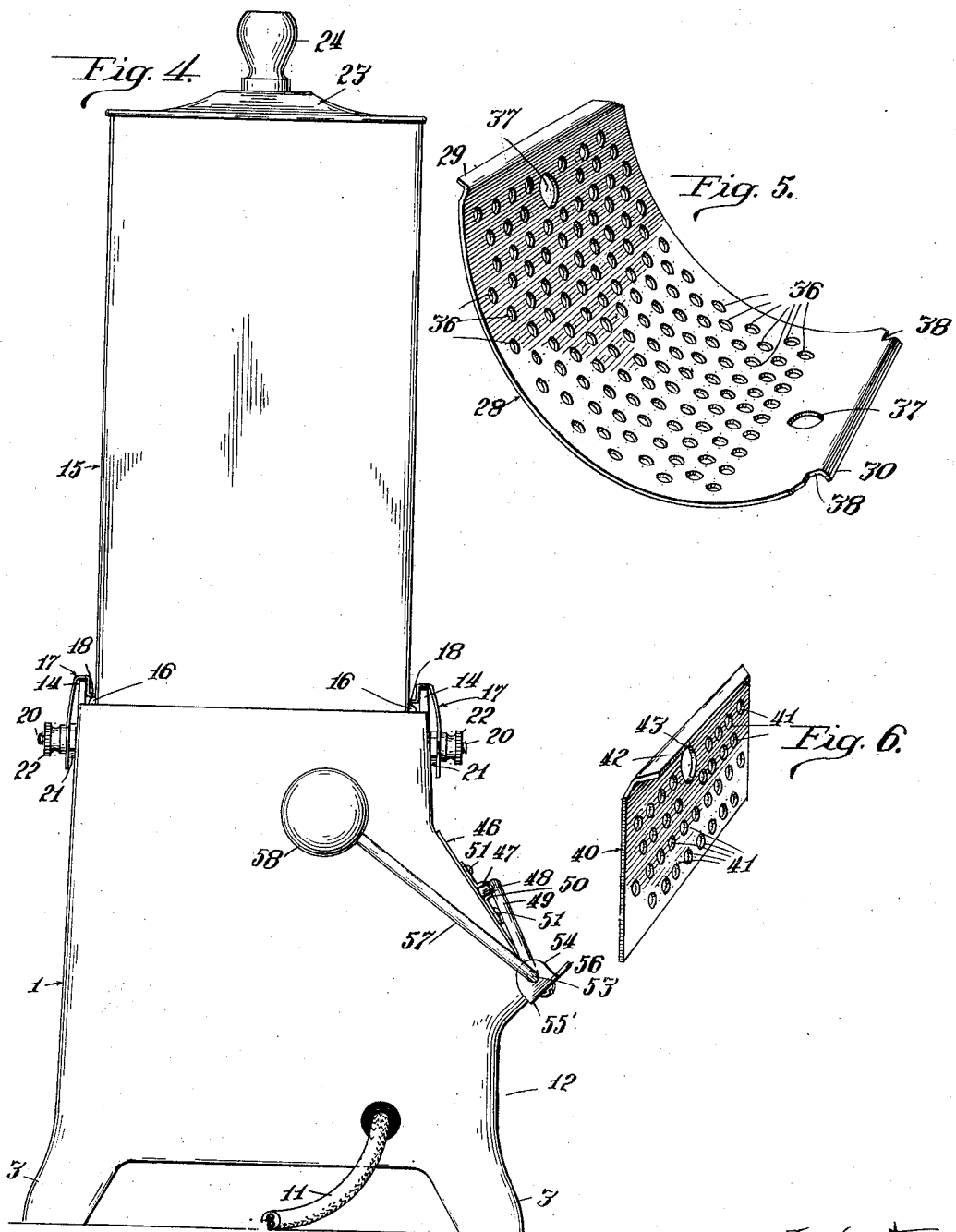

1,876,614

UNITED STATES PATENT OFFICE

ERNST C. CLAUS, OF CHICAGO, ILLINOIS

COOKER FOR FRANKFURTERS OR THE LIKE

Application filed October 16, 1930. Serial No. 489,027.

This invention relates to a vending device, and more particularly to a vending device for frankfurters or the like, the invention however, not being limited to frankfurters although the machine shown in the drawings was particularly designed for vending and cooking that kind of food.

One object of this invention is to provide a cooker which will cook or merely heat frankfurters as they travel along a predetermined path, all of the frankfurters receiving substantially the same amount of treatment.

Another object of this invention is to provide means for insuring that the frankfurters which have received the maximum amount of cooking will be the ones which may be removed from the cooker. This is insured by providing means for cooking the frankfurters as they move along a predetermined path preventing the removal thereof until the same reach a predetermined position along said path.

Another object of this invention is to feed frankfurters through a cooker in such a manner that the cooked frankfurter may be removed without the necessity of disturbing the alinement of the other frankfurters in the cooker.

In carrying out my invention, I provide a hopper in which the frankfurters may be arranged in alinement and so conveyed that their alinement will always be substantially preserved as the frankfurters are removed from a stack of the same when they reach a predetermined position to which they are moved by gravity in the machine shown in the drawings.

Another object of this invention resides in the provision of a suitable receptacle in which the frankfurters are heated, the receptacle having an opening at the top thereof through which the frankfurters are inserted and an opening near the bottom thereof through which the same may be removed without disturbing the alinement of the remaining frankfurters which are supported in the receptacle.

Preferably the directing means for directing the frankfurters along a predetermined path are made removable so that the device may be quickly cleaned on the inside as well as the outside thereof. This object is accomplished by arranging suitable baffles in the receptacle and supporting the same so that accidental replacement thereof is prevented but quick removal thereof, when desired, is insured.

The hopper which I employ preferably is constructed of glass and is separate from the main portion of the receptacle which generally will be made of metal such as aluminum. This glass hopper is arranged to be quickly detached from the bottom part of the receptacle so that the same may be readily cleaned when desired. The reason I desire to employ a glass hopper is that the articles being vended will be visible to the eye to attract attention.

It is necessary however, to clean the glass hopper more often than it would be necessary to clean a metal hopper in view of the fact that the grease from the frankfurters would be apt to give an unsightly appearance to the hopper, and it would be necessary to remove this grease in order that the customer would not be displeased with the appearance of the cooking outfit. It will be readily appreciated that if the customer is displeased with the greasy appearance of the hopper, he will be inclined not to make a purchase.

Another object of this invention is to provide a cooking unit which may be used effectively in cafeterias or other self-served restaurants. The arrangement of the cooking unit is such that the customer in a self-served restaurant would always get only the properly cooked or heated frankfurters or other articles which are being vended.

These and other objects of the invention will appear hereinafter as the description of the invention proceeds, the novel features and combination being set forth in the appended claims.

In the drawings—

Fig. 1 represents a vertical central cross-section through a machine embodying my invention;

Fig. 2 is a cross-section taken along the line 2—2 of Fig. 1;

Fig. 3 is a detail of a retaining member shown in Fig. 1;

Fig. 4 is an elevation of the device shown in Fig. 1 and looking from the same direction as in Fig. 1; and Figs. 5 and 6 are perspective views of the baffle plates used in the cooking unit.

The cooking unit which I employ comprises the receptacle 1 which has an imperforate bottom 2 and is substantially rectangular in horizontal section. The receptacle is provided with the feet 3 at the four corners thereof and an electrical heating unit designated generally as 4, and of any desired construction is arranged beneath the imperforate bottom thereof and is adapted to furnish the heat for heating the water 5 which is placed in the bottom of the receptacle 1. The heating unit is covered by an asbestos pad 6 and a metal plate 7 which are secured to the bottom of the receptacle by means of the screws 8 extending into the bosses 9. Wires 10 lead from the heating unit to a switch 12, this switch being such as to give various temperatures to the heating unit. No invention is claimed in the particular type of switch used as such switches are common to electrical heating units and are adapted to be used for the same purpose as in the present invention. The switch is also connected to a source of electrical energy by means of the cord 11.

The upper part of the receptacle is provided with a horizontal ledge 13 which extends substantially around the entire top of the receptacle and slightly below the top edge thereof so as to provide a vertical retaining flange 14 around the entire upper edge of the receptacle. The rectangular glass hopper 15 has a bead 16 around the lower outer periphery thereof. This bead is adapted to lie in close proximity to the vertical flange 14 as is clearly illustrated in Fig. 1.

A retaining member 17 substantially U-shaped in cross-section and having one leg of the U-shaped portion longer than the other, carries a projecting portion 18 on the shorter leg thereof. A slot 19 best illustrated in Fig. 3 is provided in the longer leg of the U-shaped retaining member. Screws 20 pass through openings in opposite walls of the receptacle and are held in place by means of the nuts 21. Thumb nuts 22 are screw-threaded on the protruding ends of the screws 20 and the longer legs of the U-shaped retaining members 17 are arranged between pairs of nuts 20 and 22, the screws being arranged in the slots 19 so that the retaining member 17 may be removed by sliding the same in the direction of the slot 19, thus enabling the same to be removed without the necessity of removing the nuts 22. Since it is not necessary to remove the nuts 22, the chances that the same will be lost or misplaced is obviated. The projecting portions 18 on the retaining member 17 engage the upper portions of the bead 16 and the vertical flanges 14 prevent lateral movement of the retaining member and of the hopper 15. When it becomes necessary to clean the hopper 15, all that is necessary is to remove the retaining member 17 and the hopper may be lifted clear of the receptacle. In fact it is only necessary to remove one of the retaining members as it has been found from practical experience that the retaining members yield sufficiently to permit one side of the hopper being tilted, and after that side has been raised clear of the flange 14, a slight lateral movement will disengage the other retaining member from the bead.

The hopper 15 is provided with a cover 23 having a handle 24 secured thereto by means of a screw 25 and nut 26. A retaining rib 27 extends substantially around the entire inner periphery of the cover so as to prevent lateral movement of the cover relative to the hopper.

As is best illustrated in Figs. 1, 2 and 5, a curved baffle plate 28 is arranged in the receptacle 1. This baffle plate has the laterally projecting portions 29 and 30 which abut against the retaining ledge 13 and the ledge 31 which extends around the opening 32 which is arranged in the sloping portion 33 of the receptacle 1. The curved baffle plate 28 is supported by means of the lugs 34 cast integral with the receptacle 1, these lugs 34 having the horizontally extending portions 35 as best illustrated in Fig. 2.

It will be noted that with this arrangement the extending portions 35 of the lugs 34 prevent downward movement of the baffle plate 28 and that the laterally extending portions 29 and 30 of the baffle plate prevent upward movement of the baffle plate. There is enough resiliency however, in the baffle plate to permit the same to yield sufficiently to permit one to lift the laterally projecting portions 29 or 30 clear of the projecting ledge 13 of the ledge 31 respectively. In the embodiment shown in the drawings, it will be noted from an inspection of Fig. 2 that the baffle 28 is wider than the opening which is surrounded by the ledge 13 so that one cannot remove the baffle through that opening. However, the baffle is not as wide as the opening 32, and therefore it may be removed easily through this opening although it is clearly within the scope of this invention to make the baffle 28 smaller than the opening which is surrounded by the ledge 13 to permit the baffle to be removed through that opening. However, it is quite desirable to have the baffle removable through the opening 32, as will be seen with this arrangement the baffle can be removed without removing the hopper 15.

The baffle 28 is provided with the perforations 36 to permit steam which is generated from the water in the receptacle to travel vertically through the baffle and into engagement with the frankfurters which are to be supported thereon. The baffle is also provided with the enlarged finger openings 37 which are utilized for the purpose of removing the baffle. The baffle 28 is only slightly wider than the opening formed by the ledge 13, and by a slight twisting movement of the baffle after it is released at its upper left-hand end in Fig. 1, the same may be moved through the opening 32 as previously described. The baffle is also provided with the notched corners 38 which, as best illustrated in Fig. 3, co-operate with the lugs 39 to prevent any substantial lateral movement of the forward edge of the baffle.

By an inspection of Fig. 1, it will be noted that if the device were constructed with only the parts which have been described, the frankfurters which are introduced into the hopper 15, would travel downwardly into engagement with the baffle 28 and some of the frankfurters could travel down along the right-hand side of the hopper of the receptacle to a position in front of the opening 32 before the same were thoroughly heated or cooked, and these would be the first ones to be removed, and their removal would permit others above them to fall into a position adjacent the opening 32 while other frankfurters which were thoroughly, if not overly cooked, would remain against the baffle plate and could not be readily reached. This arrangement would also cause a crowding of the frankfurters adjacent the opening 32 and cause the same to move out of the opening, even pushing open the closure therefor, which will be described presently.

In order to remedy these evils, I provide a second baffle 40 having a plurality of openings 41 therein, and a laterally extending portion 42. A finger opening 43 is also provided, and this is similar to the finger openings 37 in the baffle 28 and is for the purpose of removing the baffle. The lower edge of the baffle 40 rests in the notches 44 formed in the lugs 45 cast integral with the opposite walls of the receptacle 1 and the laterally extending portion 42 abuts against the right-hand wall of the receptacle as viewed in Fig. 1.

As will be noted from an inspection of Figs. 1 and 2, the baffle 40 is wider than the opening formed by the ledge 13 and therefore, if in Fig. 1 pressure is applied to the right-hand side of the baffle, no substantial movement may be given thereto, to the left, in view of the fact that the upper edge of the baffle will engage the ledge 13 and the lower edge is restrained from lateral movement by being arranged in the notches 44. Therefore, in order to remove the baffle 40, it is necessary to first lift the baffle out of the notches 44 and move the lower edge thereof horizontally. There is sufficient clearance between ledge 13 and the upper edge of the baffle 40 to permit the baffle to be lifted out of the notches. After this is done, the baffle may be dropped and removed through the opening 32 or turned and removed through the opening formed by a ledge 13.

While I have provided effective means for holding the baffles in place, it will be noted that by a very simple operation on the part of the operator, the baffles may be removed for the purpose of cleaning or for any like purpose.

Of course, I do not wish to limit my invention to baffles secured in place in the exact manner shown in the drawings, but the arrangement shown is unique and increases the efficiency of the device. Also if the baffles are quickly removable, the operator will be inclined to clean the apparatus more often than he might otherwise. Thus the device may be kept more sanitary than if the baffles were fixed in place.

Now it will be noticed that with the baffle 40 added to the structure, the efficiency thereof is highly increased for the frankfurters cannot now travel down the right-hand side of the hopper as viewed in Fig. 1 and into a position adjacent the opening 32 without first passing down over the baffle 40 into a position in close proximity at least, to the baffle 28 and to the steam which is rising in the receptacle. Therefore, it is practically insured that the frankfurters or other articles being heated will be properly heated by the time they reach the opening 32. Furthermore, the baffle 40 prevents crowding of the frankfurters adjacent the opening 32 so that when the closure therefor is in place, there will be no tendency for the frankfurters to open the same.

The opening 32 is covered by means of the closure 46 which is a flat plate having engagement with the outer surface of the receptacle around the edges of the opening 32. The cover 46 is carried by a pintle 47 having an offset portion 48 and supporting extensions 49, the pintle turning in the bearing members 50 secured to the closure 46 by means of the rivets 51 or the like.

The supporting extensions 49 have the laterally extending portions 52 and 53 rotatably supported in the ears 54 on the brackets 55. The brackets 55 are also provided with the stop lugs 56 which prevent the clockwise movement of the supporting extensions 49 as viewed in Fig. 1. Rotational movement of the extensions 49 in the opposite direction is, of course, limited by means of the closure 46 itself which comes into engagement with the receptacle. The lateral extension 53 is provided with an upwardly extending arm 57 which carries a handle 58 which may be used to operate the closure. It will be noted that the permitted angle of movement of the arm 57 is such as to throw the center of gravity of the enlarged handle 58 first to one side and then to the other of the pivotal support as well as to throw the closure 46 to one side or the other of the pivotal support. This enables the operator to retain the closure in an open or closed position as desired.

It may be desirable in some instances to provide a spring for holding the closure shut, and so that the same may not be accidentally left open, since if the closure is in the open position, the steam may escape through the opening 32 and, of course, this is not desirable.

It will be seen that with the arrangement which I have just described, the frankfurters may be kept in perfect alinement as they travel downwardly towards the opening 32, and that this alinement is not disturbed by the movement of the frankfurters through the lower opening. Also it will be seen that the frankfurters must pass along a predetermined path and that all of the frankfurters will be heated substantially the same amount during their travel, and there will be no opportunity for cold frankfurters or other materials which may be cooked therein coming into a position adjacent the opening 32.

The means for operating the closure is such that the pressure is applied substantially centrally of the closure instead of at one edge thereof as is the case with the usual hinged closure, and in fact most closures which have means for retaining the same in place automatically after they have once been closed. The pressure being distributed evenly over the entire area of the closure provides equal resistance against forces which might tend to open the closure.

I have previously mentioned the fact that if pressure is applied to the right-hand side of the baffle 40, there is not much possibility that the same will be displaced as the pressure would have to be resolved into a component which would lift the baffle out of the notch 44. One might consider that there may not be much opportunity for a pressure being applied to the right-hand side of the baffle in view of the fact that the frankfurters will exert a pressure only on the upper or left-hand side of the baffle. However, supposing that the operator desires to withdraw a frankfurter from the receptacle. He may inadvertently strike the baffle 40 with the fork which he probably is using, and if the baffle 40 were permited to pivot about the lower edge thereof and there were only a few frankfurters in the receptacle, the baffle would rotate in a counter-clockwise direction and fall downwardly against the baffle 28, thereby interfering with the operation of the device and necessitating a considerable amount of trouble on the part of the operator in restoring the parts to their original position, or there may be some frankfurters that are piled up adjacent the opening 32 and when the operator seeks to take one of these, an upward pressure may be imparted to others and this pressure may be extended to the plate 40. With the baffle arranged in the notches 44 and prevented from rotation by the ledge 13, of course the pressure will not of itself displace the baffle and the operation of the cooker will not be interrupted.

Obviously those skilled in the art to which this invention pertains may make other changes in the construction or in the arrangement of the various parts without departing from the spirit of this invention, and therefore I do not wish to limit myself except as pointed out in the appended claims.

Having thus fully described an embodiment of my invention, what I desire to secure by Letters Patent of the United States is:

1. In a cooker, the combination with a receptacle adapted to contain a liquid, a heating element for heating the liquid in said receptacle and generating vapor, an inclined support arranged above the liquid in the receptacle to support foodstuff, means to introduce vapor into direct contact with the foodstuff whereby the foodstuff will be cooked by the vapor while on the support above the liquid, an opening adjacent the bottom of the receptacle at the end of the support, and a normally closed door for closing said opening.

2. In a device for cooking articles, the combination with a receptacle having an open top and carrying water, of a heating element for heating the water to generate vapor, means to introduce vapor into direct contact with the articles, a support in said receptacle spaced above the water in the receptacle, said receptacle having an opening therein adjacent said support and in one side of the receptacle, said articles being carried by said support where they will be cooked by contact with the vapor generated, said articles to be cooked being introduced through the open top and removed through the opening in the receptacle.

3. A frankfurter cooker comprising a receptacle closed at the bottom so that it will hold liquid and having an opening in the top and an opening in one side thereof, a support arranged directly above the liquid for directing frankfurters in a predetermined direction toward the second opening after they are fed into the first opening, heating means for heating the liquid in the receptacle to generate steam, means to introduce steam into direct contact with the frankfurters, said frankfurters being heated and cooked by the steam generated as they pass over the support, and a baffle for directing the frankfurters in a predetermined direction and preventing them from falling adjacent said opening without first being directed to the support and into proper position relative to the steam generated by the heating means.

4. In a frankfurter cooker or the like, the combination with a container containing liquid, means for heating the liquid in the container and generating steam, means to introduce steam into direct contact with the frankfurters, said means including perforated means for supporting frankfurters adjacent the bottom of the container above the liquid whereby the steam generated will pass through the perforations and cook the frankfurters as they pass along the said supporting means, said container having an opening therein adjacent said supporting means and through which the cooked frankfurters may be removed, a hopper for supporting frankfurters above the supporting means, and a baffle for directing the movement of the frankfurters from said hopper along a predetermined path and along the supporting means in a predetermined direction, said supporting means being inclined downwardly toward said opening.

In testimony whereof I have signed my name to this specification on this 14th day of October A. D. 1930.

ERNST C. CLAUS.